United States Patent
Tabikh et al.

(10) Patent No.: US 9,649,604 B2
(45) Date of Patent: May 16, 2017

(54) INJECTOR GRID WITH TWO STAGE MIXER

(71) Applicant: ALSTOM Technology Ltd, Baden (CH)

(72) Inventors: Ali Mustapha Tabikh, Vaxjo (SE); Haitao Tu, Beijing (CN)

(73) Assignee: General Electric Technology GmbH, Baden (CH)

( * ) Notice: Subject to any disclaimer, the term of this patent is extended or adjusted under 35 U.S.C. 154(b) by 577 days.

(21) Appl. No.: 13/850,459

(22) Filed: Mar. 26, 2013

(65) Prior Publication Data

US 2013/0298996 A1   Nov. 14, 2013

Related U.S. Application Data

(60) Provisional application No. 61/645,296, filed on May 10, 2012.

(51) Int. Cl.
*B01F 5/00* (2006.01)
*B01F 5/04* (2006.01)
(Continued)

(52) U.S. Cl.
CPC ............ *B01F 5/0057* (2013.01); *B01D 53/90* (2013.01); *B01F 3/02* (2013.01); *B01F 5/0451* (2013.01); *B01F 5/0456* (2013.01); *B01F 5/0463* (2013.01); *B01F 5/0612* (2013.01); *B01F 5/0619* (2013.01); *F23J 15/003* (2013.01);
(Continued)

(58) Field of Classification Search
CPC .... B01F 5/0451; B01F 5/0453; B01F 5/0456; B01F 5/046; B01F 5/0463; B01F 5/0612; B01F 5/0619; B01F 5/0057; B01F 3/02; B01D 53/90; B01D 53/8625; F23J 15/003; F23J 2219/10; Y10T 137/0318; Y10T 137/2093
See application file for complete search history.

(56) References Cited

U.S. PATENT DOCUMENTS 4,929,088 A * 5/1990 Smith .................... B01F 5/0473
138/40
4,981,368 A   1/1991 Smith
(Continued)

FOREIGN PATENT DOCUMENTS

CN   1829565 A   9/2006
DE   3723618 C1   12/1988
(Continued)

*Primary Examiner* — Timothy Cleveland
(74) *Attorney, Agent, or Firm* — GE Global Patent Operation; Rita D. Vacca

(57) ABSTRACT

An injector mixer arrangement (10) for supplying a reducing agent in gaseous form into a flue gas flowing in a gas duct (14) communicating with a catalyst (18*a*) in a selective catalytic reduction (SCR) reactor (12) arranged downstream of said injector mixer arrangement (10). The injector mixer arrangement (10) comprises an injector grid (22) equipped with a plurality of nozzles (30) arranged horizontally within the gas duct (14). The nozzles (30) are adapted to supply said reducing agent to the gas duct (14). The injector mixer arrangement (10) further comprises first stage mixer plates (24) and second stage mixer plates (26) arranged in the gas duct (14) downstream of said nozzles (30) and upstream of SCR reactor 12.

10 Claims, 3 Drawing Sheets

(51) Int. Cl.
  *B01F 5/06* (2006.01)
  *B01F 3/02* (2006.01)
  *F23J 15/00* (2006.01)
  *B01D 53/90* (2006.01)
  *B01D 53/86* (2006.01)

(52) U.S. Cl.
  CPC .... *B01D 53/8625* (2013.01); *B01D 2251/206* (2013.01); *B01D 2257/404* (2013.01); *F23J 2219/10* (2013.01); *Y10T 137/0318* (2015.04); *Y10T 137/2093* (2015.04)

(56) References Cited

U.S. PATENT DOCUMENTS

| | | |
|---|---|---|
| 5,605,399 A | 2/1997 | King |
| 8,017,084 B1 | 9/2011 | Wirt et al. |
| 2010/0061907 A1* | 3/2010 | Sun .................. B01D 53/8625 423/239.1 |
| 2011/0146254 A1 | 6/2011 | Yi et al. |
| 2012/0014209 A1 | 1/2012 | Smith |

FOREIGN PATENT DOCUMENTS

| | | |
|---|---|---|
| DE | 43 13 393 A1 | 10/1994 |
| EP | 0 526 393 A1 | 2/1993 |
| EP | 2 420 309 A1 | 2/2012 |
| EP | 2 620 208 A1 | 7/2013 |

\* cited by examiner

INJECTOR GRID WITH TWO STAGE MIXER

CROSS-REFERENCE TO RELATED APPLICATION

This application claims the benefit of U.S. Provisional Patent Application Ser. No. 61/645,296; filed on May 10, 2012, which is incorporated herein by reference in its entirety.

FIELD OF THE INVENTION

The present invention relates to an arrangement for supplying and mixing a reducing agent in gaseous form into a flue gas flowing through a duct and into a selective catalytic reduction (SCR) reactor arranged downstream of said arrangement.

BACKGROUND OF THE INVENTION

In the combustion of a fuel, such as coal, oil, natural gas, peat, waste, etc., in a combustion plant, such as a power plant or a waste incineration plant, a process gas is generated. For separating nitrogen oxides, usually denoted NOx, from such a process gas, often referred to as a flue gas, a method is frequently used in which a reducing agent, usually ammonia or urea, is mixed with the flue gas. The flue gas, mixed with said ammonia or urea, is then passed through a catalyst to promote a selective reaction of the reducing agent with the NOx to form nitrogen gas and water vapour. Usually the catalyst is installed in what is commonly called a selective catalytic reduction (SCR) reactor. The mixing of the reducing agent and the flue gas is accomplished in a gas duct in a position upstream of the SCR reactor.

The reducing agent is supplied to the gas duct by a plurality of nozzles arranged within the gas duct. To facilitate an even distribution of the concentration of NOx and reducing agent over a given cross section of the gas duct, and thus also over a given cross section of the SCR reactor, it is known to use mixing plates in the duct to cause a turbulent flow of flue gas.

However, in many systems, the concentration of NOx and reducing agent is not evenly distributed in the flue gas over a given cross section of the SCR reactor. This poses a problem since a stoichiometric ratio between the NOx and the reducing agent is essential for achieving a good reduction of the NOx content of the flue gas and a low slip of the reducing agent from the SCR reactor.

DE 3723618 C1 discloses a device for mixing together two gaseous fluids in a gas duct. One of the fluids is supplied by a number of nozzles arranged in a row along a mixing plate. The nozzles are arranged at an angle with regard to the mixing plate and the main direction of fluid flow through the duct, whereby the supplied gas is injected into the turbulent flow downstream of the mixing plate.

SUMMARY OF THE INVENTION

An object of the present invention is to provide a robust injector mixer arrangement which provides increased reducing agent and flue gas intermixing for uniform reducing agent distribution over a given cross section of a gas duct with a minimum increase in pressure drop upstream a SCR reactor.

This object is achieved by means of an injector mixer arrangement for supplying a reducing agent in gaseous form into a flue gas flowing through a gas duct communicating with a catalyst in a selective catalytic reduction (SCR) reactor arranged downstream of said injector mixer arrangement. Such injector mixer arrangement comprises a plurality of nozzles arranged in four to eight injector grid groups in a gas duct perpendicular to the direction of flue gas flow through said gas duct. Each of the four to eight injector grid groups of nozzles is controlled by one control valve and integrated for reducing agent mixing with an associated downstream first stage mixer. As such, the plurality of nozzles are arranged to supply said reducing agent within the gas duct for intermixing with said flue gas flowing through the gas duct. The intermixed reducing agent and flue gas contact a plurality of first stage mixers arranged in the gas duct in the direct downstream path of said nozzles. Each first stage mixer is integrated with an injector grid and consists of four mixer plates arranged to create turbulence in reducing agent flowing from an associated group of nozzles. Robust uniform mixing and distribution of the reducing agent within the flue gas over a given cross section of the gas duct parallel to and downstream of the injector mixer arrangement is thus achieved.

The subject injector mixer arrangement provides a relatively efficient and even intermixing of the supplied reducing agent throughout the flue gas containing NOx, over a given cross section of the gas duct downstream of the injector mixer arrangement. Furthermore, the subject injector mixer arrangement is robust with respect to variations in power plant operating conditions since the reducing agent is supplied in gaseous form upstream of integrated first stage mixer plates. Supplying reducing agent in gaseous form in this manner also has the advantage that the structure of the nozzles can be kept very simple, thereby enabling a relatively cost-efficient injector mixer arrangement. Further, supplying reducing agent in gaseous form from the subject injector mixer arrangement allows the reducing agent to be released into the passing stream of flue gas in a very even manner, thereby minimizing pressure drops within the gas duct.

Each second stage mixer integrated with an injection grid and first stage mixer plates comprises two trapezoidal mixer plates designed and positioned within the gas duct to generate flow vortices, which emerge from opposed side edges of each mixer plate. The two flow vortices emerging from each of the two second stage mixer plates rotate in opposite directions with each vortice diameter gradually increasing as the flow vortice moves further downstream from its respective second stage mixer plate.

The subject injector mixer arrangement supplies reducing agent for intermixing with flue gas and for contact with at least one surface of at least one of four first stage mixer plates. By supplying reducing agent in this manner, the reducing agent is robustly intermixed into and throughout the flue gas by turbulence caused by contact with at least one of the first stage mixer plates prior to contacting at least one of the second stage mixer plates.

The turbulent flow generated by each integrated first stage and second stage mixer plate within the subject injector mixer arrangement have proven to result in very efficient intermixing and distribution of the reducing agent and NOx throughout the flue gas over a given horizontal cross section of the vertical gas duct parallel to and downstream of the injector mixer arrangement. Since the subject injector mixer arrangement is adapted to be positioned upstream of a SCR reactor, intermixing continues until the flue gas reaches the SCR reactor and the catalysts arranged therein. The concentration of NOx in the flue gas has, by the subject injector mixer arrangement, proven to have a surprisingly even distribution over the cross sectional area of the SCR reactor.

Trials have been conducted indicating the surprisingly beneficial effect of the subject injector mixer arrangement. More than one hundred nozzles supplying a reducing agent in a system without any mixer plates is effectively replaced with an injector mixer arrangement according to the subject arrangement comprising only a few nozzles, each having integrated first and second stage mixer plates.

Using the subject injector mixer arrangement, reducing agent is supplied upstream of its at least one integrated first stage mixer plate. The placement position of the first stage mixer plates within the gas duct and the distance between the nozzles and the first stage mixer plates depends on the angle of the first stage mixer plates with respect to the placement of the nozzle within the gas duct. Because interior edges of first stage mixer plates are positioned a greater distance from vertical walls forming the gas duct than are corresponding exterior edges, the plane of exterior surfaces of first stage mixer plates form an angle of approximately 25 to 55 degrees with respect to the corresponding vertical walls forming the gas duct.

According to one embodiment, the plurality of nozzles can be arranged in a symmetrical pattern on one or more injector grids positioned over a portion of a horizontal cross section of the longitudinal vertical expanse of the gas duct. Preferably, nozzles are symmetrically positioned around the periphery and in the center of each injector grid. Each side portion of each injector grid comprises at least one nozzle on an upper surface thereof and each side portion of each injector grid is arranged in upstream alignment between an interior edge and an exterior edge of a first stage mixer plate, for injector grid and first stage mixer plate integration.

According to one embodiment, each of the four mixing plates comprising first stage mixer plates are positioned at the same angle with respect to the side walls of the gas duct and hence their associated upstream nozzles. Such an arrangement allows for relatively easy mounting installation of the first stage mixer plates in the gas duct.

According to one embodiment, the two sets of opposed first stage mixer plates are of differing angles with respect to the side walls of the gas duct. In this embodiment, the two opposed first stage mixer plates forming a first set are of the same angle with respect to the side walls of the gas duct but differ from the angles of the two opposed first stage mixer plates forming the second set. Using such a symmetrical pattern over a cross section of the gas duct, an even distribution of reducing agent and NOx across the full cross section of the gas duct has been noted.

According to one embodiment, the injector mixer arrangement includes two second stage mixer plates trapezoidal in form integrated with each at least one injector grid and at least one first stage mixer plates. The second stage mixer plates are arranged in the gas duct in an even number of rows in a repetitive pattern. The second stage mixer plates in a first row are arranged in closest proximity to a first wall of the gas duct with major parallel edges closer to the first wall than their minor parallel edges. The major parallel edges of the second stage mixer plates in a second row, adjacent the first row, are positioned farther away from the first wall than their minor parallel edges. The second stage mixer plates in a subsequent third row, adjacent the second row, are positioned with major parallel edges closer to the first wall than their minor parallel edges. The second stage mixer plates in a subsequent fourth row, adjacent the third row, are positioned with major parallel edges farther away from the first wall than their minor parallel edges.

Such a symmetrical arrangement over a cross section of the gas duct, creates a relatively even distribution of reducing agent and NOx across the entire gas duct cross section. It is to be understood that the number of nozzles and the number of first stage and second stage mixer plates required for thorough intermixing depends on the size of the cross section of the gas duct. Trials have been made indicating that arrangements according to the subject invention, equipped with four nozzle grids with approximately nine nozzles each, sixteen first stage mixer plates and eight second stage mixer plates, is as effective as more than 100 nozzles used without mixing plates.

According to one embodiment, each second stage mixer plate is arranged with its major contact surface forming an angle of approximately 25-55 degrees from a plane parallel to the planar walls forming the gas duct. As such, the major contact surfaces of the thus angled second stage mixer plates taken together occupy approximately 30-50%, more preferred 35-45% and most preferred 38-42% of the horizontal cross sectional area of the vertical gas duct.

Tests have indicated that by arranging first stage and second stage mixer plates at such an angle with respect to their respective integrated nozzles, the turbulence within the gas duct is sufficiently large to cause an even distribution of the reducing agent and NOx over the full cross section of the gas duct downstream the injector mixer arrangement. Still, no undue restriction of the flow through the gas duct has been noted thus indicating no associated undesirable drop in pressure.

According to one embodiment, each second stage mixer plate is arranged with its major contact surface forming an angle of approximately 25-55 degrees, more preferred 27-50 degrees and most preferred 28-45 degrees from a plane parallel to the planar walls forming the gas duct.

According to one embodiment, the reducing agent is ammonia or urea supplied in dry, gaseous form. Thereby the risk of formation of deposits on the nozzles, the first stage mixer plates, the second stage mixer plates or the walls of the gas duct is eliminated.

According to one embodiment, the second stage mixer plates have a mathematic parabolic shape, or are of a combined geometry such as for example that of an acute isosceles triangle with a circular or curved geometry at its apexes. Such combined geometry also serves to enhance and improve the intermixing of reducing agent and NOx within and throughout the gas duct.

Further objects and features of the present invention will be apparent from the following detailed description and claims.

BRIEF DESCRIPTION OF THE DRAWINGS

The invention will now be described in more detail with reference to the appended drawings in which.

DESCRIPTION OF PREFERRED EMBODIMENTS

Figure 5:
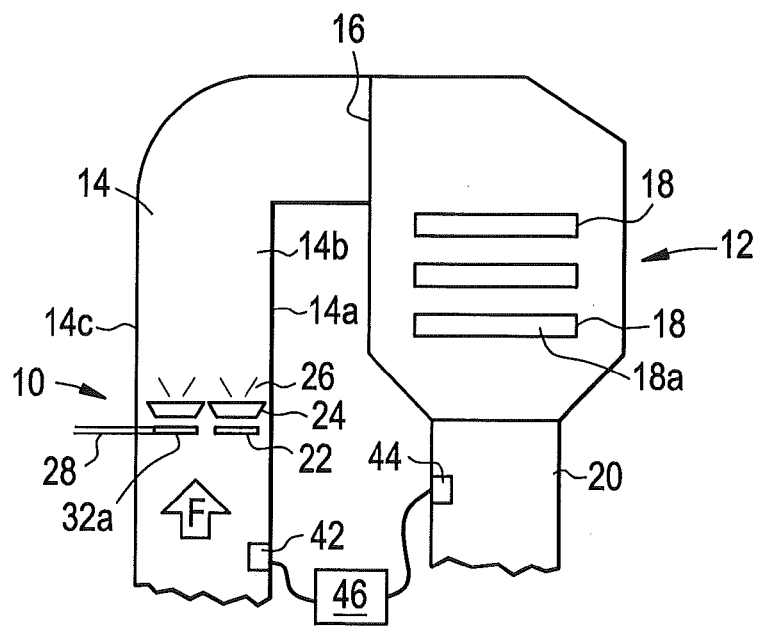
FIG. 5 is a schematic side cross-section view of the injector mixer arrangement of FIG. 1 in ductwork upstream of a selective catalytic reduction reactor.

Power plants are typically powered using coal fired boilers, or the like. In a coal fired boiler, coal is combusted in the presence of air, thereby generating a flow of process gas in the form of a flue gas, FG, that leaves the coal fired boiler via a fluidly connected gas duct 14. Through gas duct 14, flue gas flows to an inlet 16 of a selective catalytic reduction (SCR) reactor 12. FIG. 5 illustrates an injector mixer arrangement 10 according to the present invention arranged horizontally across a gas duct 14 upstream with regard to flue gas flow to SCR reactor 12. An ammonia supply system (not shown) is operative for supplying ammonia to injector mixer arrangement 10. The ammonia injector mixer arrangement 10 supplies gaseous ammonia, $NH_3$, to the flue gas flowing through gas duct 14 prior to flow into SCR reactor 12. The SCR reactor 12 comprises one or more consecutive layers 18 of SCR-catalyst 18a arranged inside the SCR reactor 12. The SCR catalyst 18a can by way of example comprise a catalytically active component, such as vanadium pentoxide or wolfram trioxide, applied to a ceramic carrier material (not shown) so as to comprise, e.g., a honeycomb structure or a plate structure. In the SCR reactor 12 the nitrogen oxides, NOx, in the flue gas react with the ammonia injected by means of the injector mixer arrangement 10 to form nitrogen gas, $N_2$. The flue gas then leaves the SCR reactor 12 via a fluidly connected exit duct 20 and is emitted into the atmosphere via a fluidly connected stack (not shown). It will be appreciated that the power plant may comprise further gas cleaning devices, such as wet scrubbers and particulate removers, such as electrostatic precipitators, not illustrated in the figures provided herewith for purposes of clarity.

Figure 1:
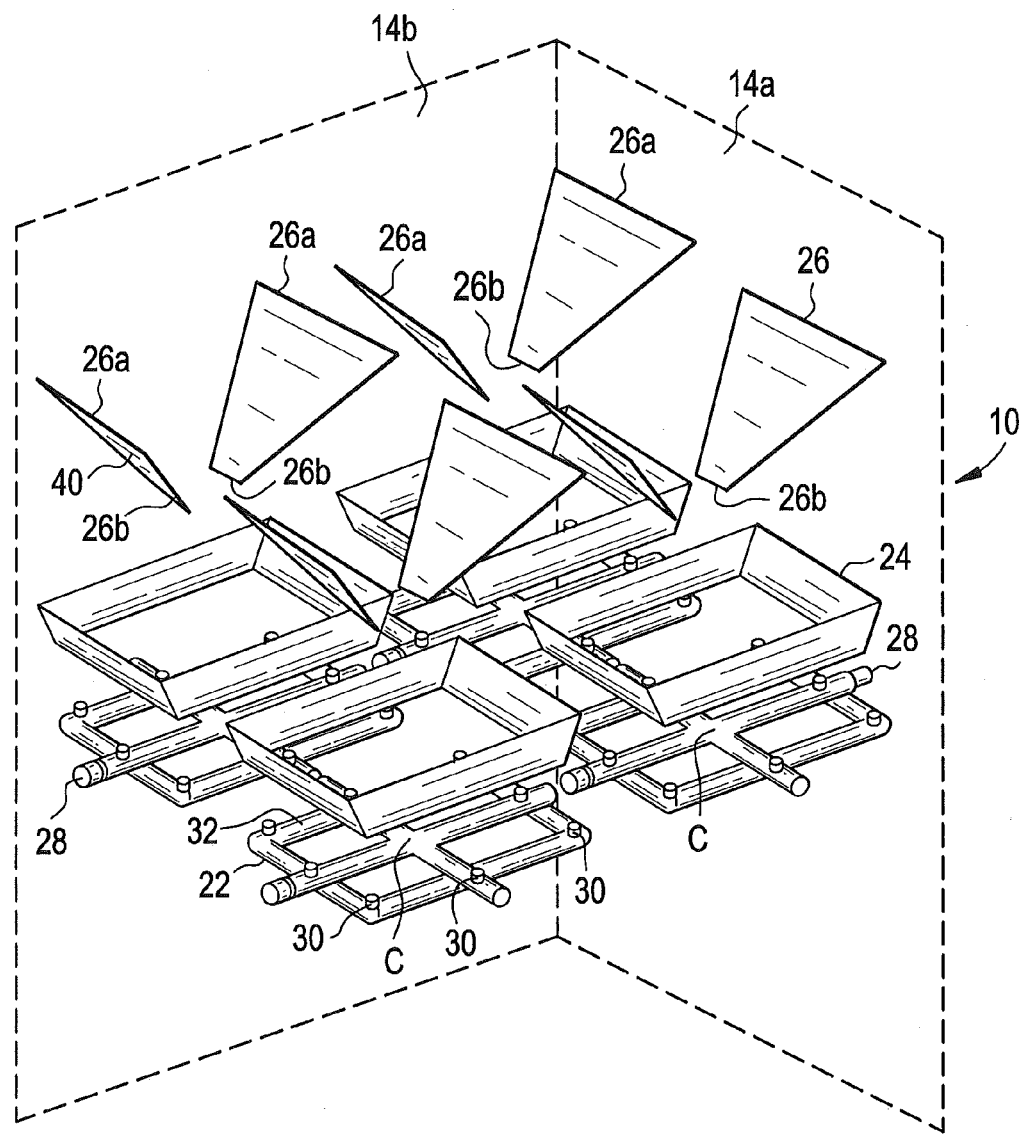
FIG. 1 is a schematic side perspective view of an injector mixer arrangement according to the present invention.

As best illustrated in FIG. 1, the injector mixer arrangement 10 of the present invention comprises at least one injector grid 22, at least one integrated first stage mixer plates 24, and at least one integrated second stage mixer plates 26. For clarity and to facilitate understanding, only two of the four longitudinal duct walls, 14a and 14b, are illustrated highly schematically with broken lines. FIG. 1 illustrates a horizontal cross section of gas duct 14 taken at a point between the boiler (not shown) and the SCR reactor 12.

Figure 2:
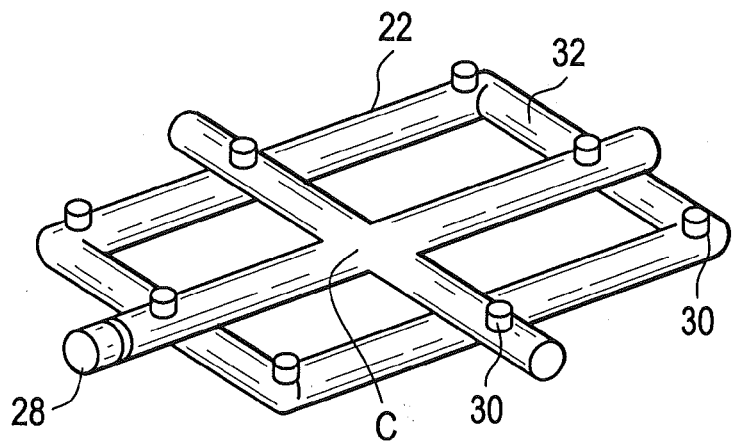
FIG. 2 is a schematic side perspective view of a gas grid injector according to FIG. 1.

As best illustrated in FIG. 1 and FIG. 2, the subject injector mixer arrangement 10 comprises a pipeline system 28 comprising at least one fluidly connected injector grid 22 equipped with a plurality of nozzles 30. The injector grid 22 generally square or rectangular in form is arranged horizontally across elongated vertical gas duct 14 so as to be perpendicular to the flow direction of flue gas through gas duct 14, as indicated by arrow "F" in FIG. 5. The injector grid 22 comprises nozzles 30 symmetrically positioned on upper surface 32 in the center (not shown) and on side portions 22a forming an injector grid periphery 22b. It is to be understood that the number of nozzles 30 and their positioning on upper surface 32 of injector grid 22 may be varied. The number of nozzles 30 should be adapted to parameters such as the quality of the flue gas, the dimensions of the gas duct 14 and the quality of the SCR reactor 12.

The pipeline system 28 of injector grid 22 fluidly communicates with a supply of reducing agent. The supply of reducing agent can be in the form of a tank or another suitable container (not shown). The pipeline system 28 and fluidly connected injector grid 22 are suitable for using a reducing agent in a dry gaseous form. As nonlimiting examples, the reducing agent can be ammonia or urea. In case of ammonia, it can either be delivered to the power plant site in gaseous form, or be delivered in liquid form for later vaporization before injection into the gas duct 14. In gaseous form, no problems associated with the formation of deposits due to any droplets or condensation interacting with particles in the flue gas are experienced.

The reducing agent is supplied by the nozzles 30 fluidly connected and arranged on upper surface 32 center "C" and side portions 22a of injector grid 22. The gaseous reducing agent is released from nozzles 30 into the passing stream of flue gas for intermixing with the same before reaching the integrated first stage mixer plates 24 and second stage mixer plates 26 arranged in the direct downstream path of nozzles 30.

By use of a reducing agent in gaseous form, the structure of nozzles 30 can be kept very simple. In its simplest form, each individual nozzle 30 is formed by an opening in upper surface 32 of injector grid 22. The gaseous reducing agent may thus be released into the passing stream of flue gas in a very smooth manner.

Nozzles 30 are preferably oriented to correspond with and operate in the flow direction "F" of the flue gas flowing through gas duct 14. Further, each nozzle 30 is preferably positioned in alignment with at least one downstream first stage mixer plate 24 and at least one second stage mixer plate 26 as described in more detail below. Each nozzle 30 is preferably operated to provide a continuous flow of reducing agent into the gas duct 14.

The pipeline system 28 is disclosed thus far as a single unitary system. However, it is to be understood that the pipeline system 28 can be divided into several systems allowing different injector grids 22 positioned in gas duct 14 to be provided with different amounts of reducing agent or with different degrees of pressurization. The latter can be useful if it has been detected by measurements made downstream of the SCR reactor that there is a non-homogenous NOx profile.

Each nozzle 30 is aligned with or integrated with at least one first stage mixer plate 24. The first stage mixer plates 24 are arranged downstream of nozzles 30. The number of first stage mixer plates 24 may correspond to the number of nozzles 30, with each first stage mixer plate 24 positioned to cooperate with an integrated nozzle 30. It is however understood that each first stage mixer plate 24 may be integrated with more than one nozzle 30 as illustrated in FIG. 1.

Figure 3:
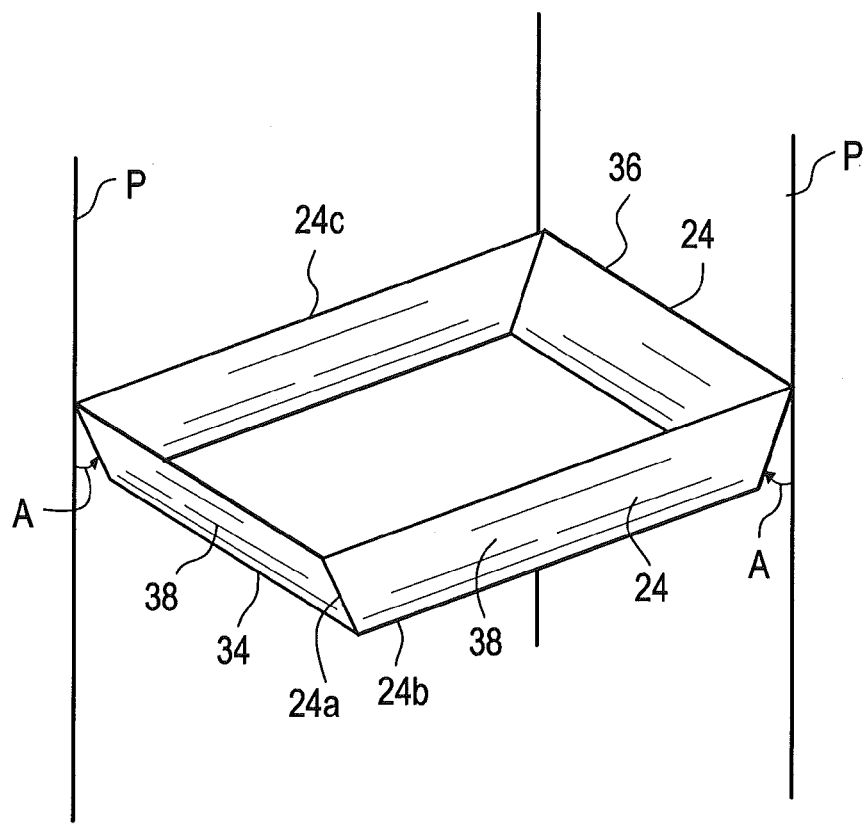
FIG. 3 is a schematic side perspective view of a first stage mixer according to FIG. 1.

Each first stage mixer plate 24 has a trapezoidal geometry. Each non-parallel edge 24a of each first stage mixer plate 24 is joined to a non-parallel edge 24a of another first stage mixer plate 24 to form a generally square or rectangular configuration. As such, the minor parallel edges 24b of mixer plates 24 form interior edges 34 and the major parallel edges 24c form exterior edges 36 as illustrated in FIG. 1 and FIG. 3. Because interior edges 34 of first stage mixer plates are positioned more inwardly toward center "C" of injector grid 22 than are exterior edges 36, exterior surfaces 38 of first stage mixer plates 24 form an angle "A" of approximately 25 to 55 degrees with respect to a plane "P" parallel to vertical planar walls 14a, 14b, 14c and 14d (not shown) forming gas duct 14.

Figure 4:
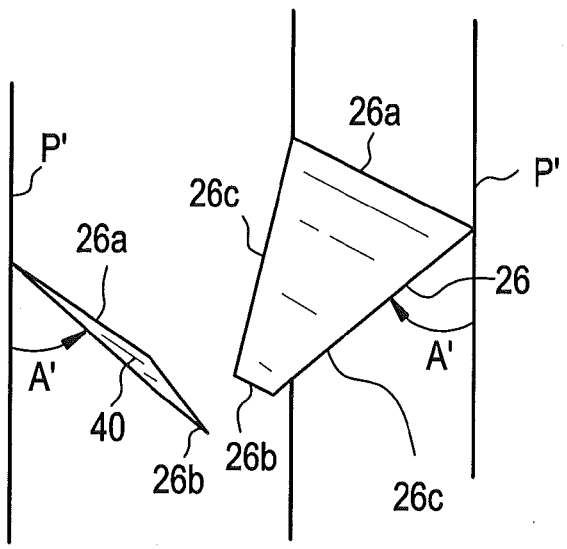
FIG. 4 is a schematic side perspective view of a second stage mixer according to FIG. 1.

As best illustrated in FIG. 1 and FIG. 4, the subject injector mixer arrangement 10 also comprises second stage mixer plates 26 trapezoidal in form. The second stage mixer plates 26 are arranged in the gas duct 14 in an even number of rows in a repetitive pattern. The second stage mixer plates 26 in a first row are arranged in closest proximity to a first wall 14a of the gas duct 14 with major parallel edges 26a closer to the first wall 14a than their minor parallel edges 26b. The major parallel edges 26a of the second stage mixer plates 26 in a second row, adjacent the first row, are positioned farther away from the first wall 14a than their minor parallel edges 26b. The second stage mixer plates 26 in a subsequent third row, adjacent the second row, are positioned with major parallel edges 26a closer to the first wall 14a than their minor parallel edges 26b. The second stage mixer plates 26 in a subsequent fourth row, adjacent the third row, are positioned with major parallel edges 26a farther away from the first wall 14a than their minor parallel edges 26b.

Each second stage mixer plate 26 is arranged with its lower major contact surface 40 forming an angle "A'" of approximately 25-55 degrees from a plane "P'" parallel to planar walls 14a, 14b, 14c and 14d (not shown) forming gas duct 14. As such, the lower major contact surfaces 40 of the thus angled second stage mixer plates 26 when taken together occupy approximately 30-50%, more preferred 35-45% and most preferred 38-42% of the horizontal cross sectional area of the gas duct 14.

Tests have indicated that by arranging the first stage and second stage mixer plates at such angles, A, A', with respect to their downstream nozzles 30, the turbulence within the gas duct 14 is sufficiently great enough to cause an even distribution of the reducing agent and NOx over a full horizontal cross section of the gas duct 14 downstream the injector mixer arrangement 10. Still, no undue restriction of the flow through the gas duct 14 has been noted thus indicating no associated undesirable drop in pressure.

According to one embodiment, each second stage mixer plate 26 is arranged with its lower major contact surface 40 forming an angle A' of approximately 25-55 degrees, more preferred 27-50 degrees and most preferred 28-45 degrees from a plane P' parallel to the planar walls 14a, 14b, 14c and 14d (not shown) forming gas duct 14.

According to one embodiment, the reducing agent is ammonia or urea supplied in dry, gaseous form. Thereby the risk of formation of deposits on the nozzles 30, the first stage mixer plates 24, second stage mixer plates 26 or the walls 14a, 14b, 14c and 14d of gas duct 14 is eliminated.

According to FIG. 4, the second stage mixer plates 26 are trapezoidal in form. However, second stage mixer plates 26 could alternatively have a mathematic parabolic shape, or a combined geometric form such as for example that of an acute isosceles triangle with a circular or curved geometry at its apexes (not shown). Such combined geometric form also serves to enhance and improve the intermixing of reducing agent and NOx within and throughout the gas duct.

Now referring to FIG. 5, a method of using the subject injector mixer arrangement 10 is schematically illustrated. Upstream of the injector mixer arrangement 10 flue gas flows from a combustion process inside gas duct 14 toward SCR reactor 12 thereby passing through injector mixer arrangement 10 positioned horizontally across elongated gas duct 14 so as to be perpendicular to the flow of flue gas therethrough. Flue gas stream F, flowing through gas duct 14, first contacts lower surface 32a of injector grid 22. The flue gas flows around injector grid 22 and contacts reducing agent flowing from nozzle 30 prior to contacting exterior surface 38 of first stage mixer plate 24. The interior edges 34 of first stage mixer plates 24 are positioned in a horizontal plane a distance of approximately 0.1 to 1 meter from a horizontal plane of upper surface 32 of injector grid 22, or from outlet (not shown) of nozzle 30 if not in the same plane as upper surface 32. Flue gas and reducing agent flow around first stage mixer plates 24 causing intermixing thereof prior to contacting lower major contact surfaces 40 of second stage mixer plates 26. Minor parallel edges 26b of second stage mixer plates 26 are positioned in a horizontal plane a distance of approximately 1 to 2 meters from a horizontal plane of exterior edges 36 of first stage mixer plates 24. While the subject injector mixer arrangement 10 comprises a plurality of nozzles 30 and mixing plates 24 and 26 downstream thereto, for purposes of simplicity of explanation, the following description will focus on one nozzle 30 and its integrated mixing plates 24 and 26.

Upon flue gas contact with lower major contact surfaces 40 of second stage mixer plates 26, vortices V1 are formed along the two opposing side edges 26c of the second stage mixer plate 26. Vortices V1 are formed essentially along the full length of the two side edges 26c, but are strongest approximately midway between major parallel edge 26a and minor parallel edge 26b. The generally trapezoidal geometry of second stage mixer plate 26 thus generates at least two vortices V1 emerging from opposing side edges 26c of the second stage mixer plate 26. The vortices V1 gradually tend to follow the general flow direction F of flue gas through the gas duct 14 away from the second stage mixer plate 26, while gradually increasing in diameter as their distance from the second stage mixer plate 26 increases. The two generated vortices V1 rotate in opposite directions. The actual characteristics of the vortices V1 is a function of factors such as the angle A' of the second stage mixer plate 26 with respect to the flow direction F of the flue gas FG and the geometry of the second stage mixer plate 26.

Gas duct 14 equipped with an injector mixer arrangement 10 comprises at least two sets of injector grids 22 with nozzles 30 and integrated mixer plates 24 and 26. The turbulence generated by one such set of an injector grid 22 with nozzle 30 and its integrated mixer plates 24 and 26, add to the turbulence generated by adjacent sets 22, 30, 24 and 26, regardless of whether the sets 22, 30, 24 and 26 are adjacently spaced or spaced apart over the cross section of the gas duct 14.

Use of injector mixer arrangement 10 as described above results in a very efficient intermixing and distribution of the reducing agent with the NOx in the flue gas, FG, over a cross section of gas duct 14. Since the injector mixer arrangement 10 is positioned upstream of the SCR reactor 12, intermixing continues until the flue gas FG reaches the SCR reactor 12 and contacts the SCR-catalyst 18a arranged therein. The concentration of the NOx in the flue gas has, using injector mixer arrangement 10 as described, has proven to achieve surprisingly even distribution over a horizontal cross sectional area of the SCR reactor 12.

Test results indicate the surprisingly beneficial effect of the use of injector mixer arrangement 10 as described. With such use, more than 100 nozzles 30 supplying a reducing agent in a gas duct 14 without any mixer plates could be replaced with injector mixer arrangement 10 as described comprising only a few nozzles 30, each having integrated mixer plates 24 and 26.

Injector mixer arrangement 10 may be connected to a control system (not shown) to regulate the level of supply of reducing agent to gas duct 14 based on the amount of NOx in the flue gas downstream of the SCR reactor 12. Such control system may control reducing agent flow through nozzles 30 individually or may control the level of reducing agent supplied by pipe system 28 supporting a number of nozzles 30.

In its simplest form illustrated in FIG. 5, a first NOx analyzer 42 is operative for measuring the amount of NOx in the flue gas of gas duct 14 after the boiler and upstream of the SCR reactor 12. A second NOx analyzer 44 is operative for measuring the amount of NOx in the flue gas of exit duct 20 downstream of the SCR reactor 12. A controller 46 receives data input from the first NOx analyzer 42 and the second NOx analyzer 44. Based on that data input, the controller 46 calculates a present NOx removal efficiency. The calculated present NOx removal efficiency is compared to a NOx removal set point. Based on the result of the comparison, the amount of reducing agent supplied to the flue gas is adjusted for optimal efficiency.

It is to be understood that when a control system is used, the described embodiment herein is only one possible solution. Depending on the number of sensors used downstream of the SCR reactor 12, it is possible to control the cleaning efficiency of the SCR reactor 12 at different points between the boiler and exit duct 20.

It is also to be understood that a load sensor (not shown) operative for sensing the load on the boiler may be used. Such load could be expressed in terms of, for example, the amount of fuel, such as ton/hour of coal transported to the boiler. The data signal from such load sensor is useful to further control the amount of reducing agent supplied to the injector mixer arrangement 10. According to one embodiment, flue gas NOx profile data is generated on a regular basis, based on NOx measurements performed upstream and/or downstream of the SCR catalyst 18*a*. An advantage of this embodiment is that changes in the NOx profile, such changes being caused by, for example, a change in the load on the boiler, a change in the fuel quality, a change in the status of the burners of the boiler, etc., can be accounted for in the control of the amount of the reducing agent supplied to injector mixer arrangement 10, such that efficient NOx removal can be ensured at all times.

It is also to be understood that the NOx profile data could be obtained by making manual measurements, to determine a suitable amount of reducing agent is supplied by injector mixer arrangement 10 to the flue gas in gas duct 14.

It has been described hereinbefore, that the present invention can be utilized for cleaning a process flue gas generated in a coal fired boiler. It will be appreciated that the invention is useful also for other types of process gases, including process gases generated in oil fired boilers, incineration plants, including waste incineration plants, cement kilns, blast furnaces and other metallurgical plants including sinter belts, etc.

Further, it is to be understood that that the gas duct 14 can be provided with additional nozzles 30 not being integrated to specific mixer plates 24 and 26. However, such extra nozzles 30 should be regarded as an optional feature if the gas cleaning should require an extra supply of reducing agent. Such extra nozzles 30 can be arranged at any suitable position in the gas duct 14, no matter if it is downstream or upstream of the injector mixer arrangement 10.

Likewise, it is to be understood that the gas duct 14 can be provided with additional mixing plates 26 of any geometry, downstream or upstream of the injector mixer arrangement 10 to further increase the turbulence and the intermixing of reducing agent with the flue gas.

It will be appreciated that numerous variants of the above described embodiments of the present invention are possible within the scope of the appended claims.

To summarize, the present disclosure relates to an injector mixer arrangement 10 for supplying a reducing agent in gaseous form into a flue gas FG flowing in a gas duct 14 communicating with a catalyst 18*a* in a selective catalytic reduction (SCR) reactor 12 arranged downstream said injector mixer arrangement 10. The injector mixer arrangement 10 comprises a plurality of nozzles 30 arranged in a horizontal injector grid 22 in the gas duct 14. The nozzles 30 are adapted to supply said reducing agent. The injector mixer arrangement 10 further comprises a plurality of mixing plates 24 and 26 arranged in the gas duct 14 downstream of said nozzles 30. Each mixing plate 24 and 26 is adapted to cooperate with at least one integrated nozzle 30.

The invention claimed is:

1. An injector mixer arrangement comprising:
    a plurality of nozzles arranged on an upper surface and periphery side portions of an injector grid of a square or rectangular configuration arranged within a gas duct perpendicular to flue gas flow operable to supply reducing agent to the gas duct upstream of a catalyst arranged in a selective catalytic reduction reactor in communication with the gas duct;
    a plurality of trapezoidal first stage mixer plates directly adjoined one to another at non-parallel sides forming a square or rectangular configuration arranged in the gas duct downstream of said nozzles, with the plurality of adjoined first stage mixer plates forming the square or rectangular configuration aligned with the square or rectangular configuration of the periphery side portions of the injector grid and the plurality of nozzles arranged on the periphery side portions of the injector grid, with exterior surfaces of the plurality of adjoined trapezoidal first stage mixer plates forming an angle of 25 to 55 degrees with respect to planar walls forming the gas duct; and
    a plurality of non-adjoined second stage mixer plates arranged in the gas duct downstream of said adjoined trapezoidal first stage mixer plates, wherein each non-adjoined second stage mixer plate generates two vortices operative for intermixing a flue gas and the reducing agent within the gas duct prior to intermixed flue gas and reducing agent contact with the catalyst in the selective catalytic reduction reactor.

2. The injector mixer arrangement of claim 1, wherein an upper surface of said injector grid is a distance of approximately 0.1 to 1 meter from an interior edge of the first stage mixer plates.

3. The injector mixer arrangement of claim 1, wherein each first stage mixer plate and each second stage mixer plate has a trapezoidal geometry.

4. The injector mixer arrangement of claim 1, wherein exterior edges of the first stage mixer plates are a distance of approximately 1 to 2 meters from minor parallel edges of the second stage mixer plates.

5. The injector mixer arrangement of claim 1, wherein the plurality of nozzles arranged on the injection grid over a cross section of the gas duct provides at least one nozzle with at least one first stage mixer plate of the plurality of first stage mixer plates and at least one second stage mixer plate of the plurality of second stage mixer plates arranged in a downstream reducing agent flow from the at least one nozzle.

6. The injector mixer arrangement of claim 5, wherein interior edges of the adjoined first stage mixing plates are relatively shorter than exterior edges of the adjoined first stage mixing plates and the interior edges of the adjoined first stage mixing plates are arranged within the gas duct in closer proximity to the injection grid than are the exterior edges of the adjoined first stage mixing plates.

7. The injector mixer arrangement of claim 1, wherein each second stage mixing plate is arranged at an angle within the gas duct in vertical arrangement, and the plurality of second stage mixing plates occupies 30-50% of a horizontal cross sectional area of the vertically arranged gas duct.

8. The injector mixer arrangement of claim 1, wherein interior edges of the adjoined first stage mixing plates are relatively shorter than exterior edges of the adjoined first stage mixing plates arranged within the gas duct at a turbulence inducing angle of 25-55 degrees with respect to a plane parallel to walls of the gas duct in vertical arrangement.

9. The injector mixer arrangement of claim 1, wherein the reducing agent is ammonia or urea supplied in gaseous form.

10. The injector mixer arrangement of claim 1, wherein the second stage mixer plates are trapezoidal in form and generate oppositely rotating vortices operative for mixing flue gas and reducing agent flowing in the gas duct.

* * * * *